April 7, 1953 M. J. STOLAROFF 2,634,335

MAGNETIC RECORDING SYSTEM WITH NEGATIVE FEEDBACK SYSTEM

Filed Dec. 18, 1948

INVENTOR,
MYRON J. STOLAROFF.
BY Donald K. Lippincott
ATTORNEY.

UNITED STATES PATENT OFFICE 2,634,335

MAGNETIC RECORDING SYSTEM WITH NEGATIVE FEEDBACK SYSTEM

Myron J. Stolaroff, Redwood City, Calif., assignor to Ampex Electric Corporation, San Carlos, Calif., a corporation of California Application December 18, 1948, Serial No. 66,041

5 Claims. (Cl. 179—100.2)

Figure 1:
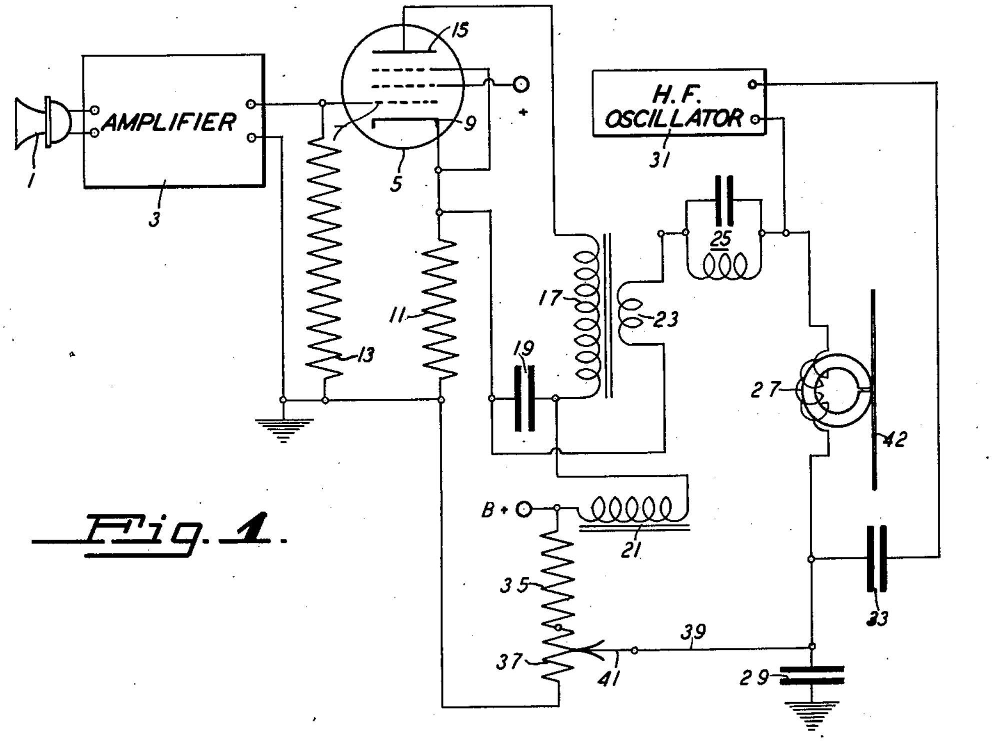

This invention relates to apparatus for magnetic recording on wire, tape, or disk, and particularly to amplifier circuits for making high quality recordings such as are used for radio transcriptions and the like.

Irrespective of the physical form of the recording medium used, all of such systems record by moving the magnetic medium past a pair of pole pieces forming a portion of an electromagnetic circuit which is excited by currents of the frequencies to be recorded, in such manner that elementary sections of the medium are included in the magnetic circuit and are magnetically polarized to a degree which is proportional to the instantaneous values of the sound pressure to be recorded. In the systems which have proved most practical the intensity of magnetization should, if the system is to be distortionless, be proportional to the amplitude of the pressure and independent of the frequency being recorded.

The recording head itself is essentially a simple electromaget with a small gap in the magnetic circuit. The core is made of high permeability, low-loss material, so that the over-all reluctance of the circuit is almost entirely due to the reluctance of the gap and the flux through the gap and the recording medium therefore varies substantially linearly with the current in the magnetizing coil. The head itself therefore appears to the circuit as a substantially pure inductive reactance, the impedance of which varies linearly with frequency.

It is well known that the quality of the recording is very greatly improved by imposing upon the record, preferably simultaneously with the frequencies to be recorded, a high-frequency or ultrasonic bias. This frequency must be high in comparison with the highest frequencies to be recorded, and both economy and considerations of magnetic circuit design dictate that the same winding be used for both the recorded frequencies and the biasing frequencies. The impedance of the winding to the biasing frequency will therefore be several times its impedance to the highest frequency to be recorded, and hence, in order to pass sufficient biasing frequency current with the voltages reasonably available, the impedance of the head to the recording frequencies will be relatively low even for the highest of these latter, and very low indeed at the lower end of the frequency spectrum to be recorded.

Owing to the variation of the impedance of the head with frequency, plus the fact that with ordinary amplifier systems the voltage available is a direct function of the sound pressure, the current through the head will be much greater for low frequencies than for high at a given amplitude of input unless the total impedance of the head circuit is essentially resistive and high in comparison with the impedance of the head itself.

There are two generally accepted methods of accomplishing this. The one most generally used employs triode amplifiers to feed the head, and employs, in series with the head itself, a high resistance. This works very satisfactorily, but it is highly uneconomical, since there are large voltage drops through the series resistor, D. C. and A. C. Only a small portion of the amplified power available is therefore effective for recording, and owing to the relatively low plate voltage available upon the amplifier, it is itself inefficient.

The second method of maintaining the constant current with constant amplitude relationship which has been used in the past has been to supply the recording head from a pentode tube, the plate resistance of which is so high that external impedances in the plate circuit have practically no effect. This has not proved satisfactory, since harmonic distortions introduced by the amplifier tube itself have proved to be more disturbing than the amplitude distortions which it was intended to overcome.

The broad purpose of this invention, therefore, is to provide an efficient and substantially distortionless magnetic recording circuit. Contributory to this end, among the objects of my invention are to provide a circuit of the character described wherein the current in the recording head is directly proportional to the amplitude of the sound to be recorded; to provide a circuit wherein a low impedance head may be used, thus permitting high-frequency bias to be applied in satisfactory amplitude at reasonable voltage and power; to provide a circuit which will also permit the additional use of a simultaneous D. C. bias, as described in the co-pending application of John T. Mullin and the applicant, Serial No. 67,278, filed December 27, 1948; and to provide a circuit which will suppress not only the distortions introduced by the amplifier tubes, but also those which are inherent in the recording head itself as a result of alinearities in the magnetic circuits.

Considered broadly, the circuit of my invention comprises the use of a high impedance amplifier tube, preferably a pentode, which feeds a current transformer having a considerable step-down ratio. The secondary winding of the step-down transformer feeds a low impedance recording head, and also applies a considerable negative feedback to the amplifier tube, either with or without the use of additional negative feedback from the primary.

Figure 2:
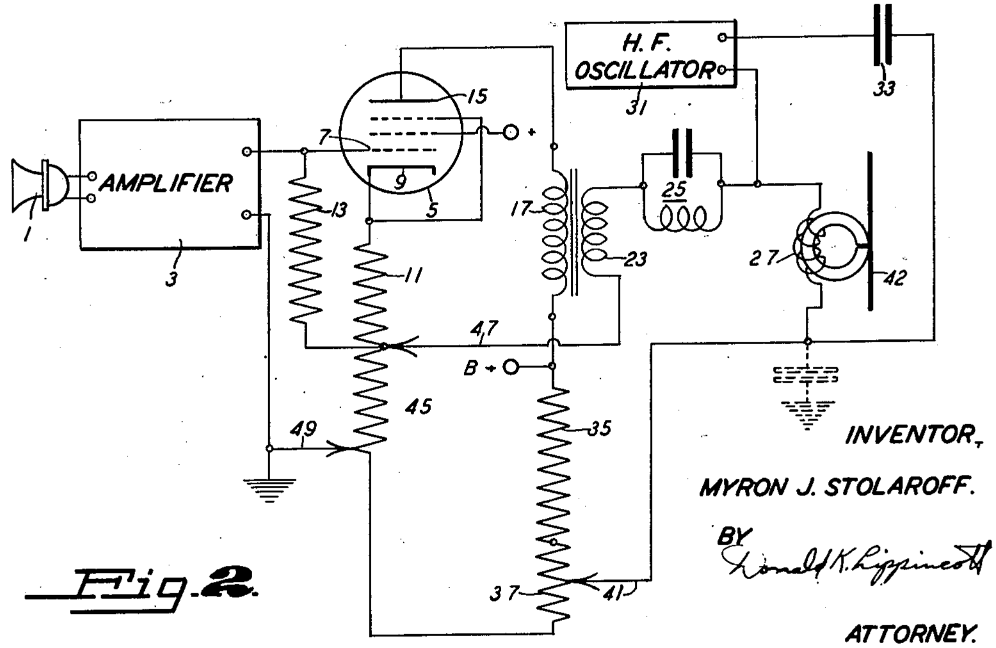

Referring to the drawings, Fig. 1 is a schematic diagram of a preferred form of the invention, wherein the entire negative feedback is derived from the secondary circuit; and Fig. 2 is a modified form of the invention employing primary feedback simultaneously with the secondary feedback.

Considering first Fig. 1, the microphone or other conventional pickup 1 feeds a preamplifier 3. These are purely conventional and may be of any high quality type. The preamplifier feeds a high impedance power output tube 5, such as a pentode. One lead from the amplifier connects to the control grid 7, and the other is grounded. The cathode 9 of the pentode also is connected to ground through a feedback and biasing resistor 11. Grid resistor 13 establishes the operating potential of control grid 7 in the usual manner. The power supplies for the screen grid and anode circuit of the pentode are conventional and are not shown, and the same is true of the cathode heater circuits.

The output circuit of the pentode connects from the anode or plate 15 through the primary 17 of a stepdown current transformer, and the A. C. circuit is completed to the cathode end of the resistor 11 through a blocking condenser 19. The D. C. circuit connects through a choke coil 21 to the positive side of the power supply B+.

The secondary coil 23 of the current transformer connects through an anti-resonant blocking circuit 25, tuned to the ultrasonic biasing frequency, to the recording head 27, and thence to ground through a bypass condenser 29. The other end of the winding 23 connects directly to the cathode 9 of the amplifier tube and thence back to ground through the resistor 11.

The high-frequency bias is supplied by an oscillator 31, the output of which is connected across the recording head 27 through a blocking condenser 31. The anti-resonant circuit 25 prevents any material current flow from the oscillator through the current transformer secondary.

As is disclosed in the co-pending joint application, Serial No. 67,278, filed December 27, 1948, above referred to, it is advantageous to add to the high-frequency bias a very small direct current bias as well. This can be applied in the present case by a slight modification of the circuit shown in the co-pending application. A bridge circuit is connected across the power supply, one arm of the bridge comprising the space circuit (i. e. plate to cathode path) in the tube 5, and the resistor 11. The D. C. resistances of the primary 17 and the choke 21 in this arm are negligible in comparison with the plate resistance of the tube 5. The other arm or branch of the bridge circuit comprises a high resistance (of the order of 30,000 ohms) 35 in series with a relatively low resistance potentiometer 37, say of 500 ohms. The cross-arm of the bridge connects from the cathode of the tube 5 and comprises the secondary circuit of the transformer including the coil 23, the recording head, and a lead 39 connecting from the recording head to the contact arm 41 of the potentiometer. By adjusting the contact arm a very small D. C. component (perhaps 1 milliampere as compared to 15 milliamperes of ultrasonic bias) can be made to flow in the recording head.

The recording medium 42 is moved past the recording head at constant speed in the usual manner, by driving means not shown.

The performance of this circuit can best be understood by considering an actual case. The tube chosen as the pentode 5 is a 6AC7, having a plate resistance of about 750,000 ohms and a mutual conductance of 9,000 microhms. The current transformer has a stepdown ratio of 5½:1, and the recording head a maximum impedance at 15,000 cycles of about 600 ohms. This impedance is reflected back into the primary circuit as 18,000 ohms, which, added vectorially to the plate resistance of three-quarters of a megohm makes a total change in impedance too small to be appreciable. The impedance of the head, of course, varies inversely with frequency and therefore the desideratum of substantially constant impedance in the recording circuit is met.

The cathode bias and feedback resistor 11 in this case is 240 ohms. This value will give a plate current of about 9 milliamperes, which is approximately normal for this tube. The secondary current in the recording circuit also flows in resistor 11, and the transformer secondary is so poled that the drop through it results in negative feedback. The amount of feedback reduces the distortion of the tube plus that introduced by the recording circuit by a factor of $$\frac{1}{1+G_m R_c r}$$

where $G_m$ is the transconductance of the tube in ohms, $R_c$ is the value of the cathode resistor, and $r$ is the stepdown ratio of the transformer. In this case the value of this fraction is $$\frac{1}{13.9}$$

or 7.2% of the initial tube distortion. Since a pentode tube of this type connected to a low impedance load will give an over-all harmonic distortion of somewhere in the neighborhood of 20% at full load the total distortion with feedback becomes 1.44% maximum, which is a value which can easily be tolerated, especially since full load is rarely even approached.

The advantage of using the secondary circuit to provide the feedback is that it reduces the distortions due to alinearity in the magnetic circuit as well as the tube distortion itself. For this reason it is of some advantage to derive all of the negative feedback from the secondary circuit, and the value of the cathode resistor necessary to provide the proper bias also works out to a value which is satisfactory from the point of view of negative feedback. This may not always be the case, and Fig. 2 shows a modification of the circuit which permits both primary and secondary feedbacks to be used, and allows the feedback and bias voltages to be separately adjusted. Since the distortions introduced by the tube itself are large in comparison with those introduced by the recording circuit, the organization shown in Fig. 2 may be the more desirable, particularly since it requires fewer circuit elements.

The major elements in the circuit of Fig. 2 are identical with those shown in Fig. 1, and are identified by the same reference characters. The changes lie in the fact that the choke coil 21 and by-pass condenser 19 of Fig. 1 are omitted, transformer primary 17 connecting directly to the B+ terminal of the power supply. Furthermore, in addition to the cathode resistor 11, which is the same as in Fig. 1, there is an additional resistor 45 inserted in the input circuit between the cathode resistor and ground.

The connections of the leads 47 from the lower end of the current transformer and 49 from the ground side of the amplifier 3 to the resistor network 11—45 are shown as variable, although in actual practice suitable values may be chosen either by computation or experiment, and fixed resistors used. If it be assumed that resistor 45 has the same value as resistor 11, the tube 5 being the same as before, and the connections of leads 47 and 49 are made to the points shown, there will be a negative feedback voltage drop in resistor 45 due to the secondary current alone of the same value as that computed in the case first considered. There will also be a negative feedback due to the primary current drop in both resistors 11 and 45, and the equation for distortion reduction becomes $$\frac{D'}{d}=\frac{1}{1+G_m[R'_c(r+1)+R_c]}=\frac{1}{16.2}=.062$$

In this case D′ is the distortion with feedback and $d$ the distortion without feedback, and $R'_c$ is the value of resistance 45. This equation applies to the tube distortion alone; that portion of the distortion due to the magnetic circuit will be reduced by the same percentage as before, but since this is small in comparison with the tube distortion, the result may be an actual improvement over the performance of the circuit of Fig. 1. Still assuming 20% tube distortion, this connection reduces the latter to about 1.23% in comparison with the connection of Fig. 1. If now the connection 47 is moved to the cathode of tube 5, other connections remaining as before, the feedback due to the secondary current is doubled, reducing the tube distortion by a factor of $$\frac{1}{28}$$

or to about 3½% of its original value; i. e., about .7%. The recording circuit distortion is reduced a little less, or to about 4% of the original value.

If, with the connection 47 still at the cathode, the connection 49 is moved up the resistor 45 to the lower end of resistor 11, the feedback from the secondary reduces to the same value as given in the example of Fig. 1, while that from the primary reduces to half the value with the connection as actually shown in the figure. The tube distortion is reduced to about 6.6% of the value without feedback, the secondary distortion to 7.2% of its original value.

It will be understood, of course, that as in all cases where negative feedback is used, the transfer characteristic of the tube circuit is reduced to the same degree as is the distortion.

The above examples are given to show the flexibility of the system. In the extreme case cited for illustration, with resistor 45 cut out altogether, it will be realized that it has no effect upon the circuit at all and might as well be omitted. It will further be recognized that if the ratio of the transformer is changed the amount of secondary feedback is changed in the same proportion. The magnetizing turns on the recording head may be varied in the same ratio as the secondary turns on the transformer, and the magnetization will remain the same as far as the recorded frequencies are concerned, but the impedance of the head will go up as the square of the number of turns and the voltages developed by the high-frequency bias must go up accordingly if the same biasing effect is to be maintained. It is therefore actually the high-frequency biasing circuit which dictates the design, and the values of the various resistors can be varied accordingly to get the same result.

I am aware that it is customary to use negative feedback to correct the operating characteristic of pentode tubes, and I make no claim to have originated this procedure as such. For magnetic recording, however, the circuits here disclosed offer material advantages over the conventional methods of applying such negative feedbacks. I desire protection thereon as broadly as possible within the scope of the following claims.

I claim:

1. In a magnetic recording circuit responsive to signals from a source of signal voltage of the frequency range to be recorded, an amplifier tube having plate, control grid and cathode elements, a signal input circuit coupled to the tube to apply signal voltage to the control grid, an output circuit for the tube including a source of plate voltage and the plate to cathode path of the tube, a step down transformer having primary and secondary windings, the primary winding being included in the output circuit whereby said transformer is energized by signal energy responsive to application of signal voltage to the input circuit, magnetic recording head having a winding, a secondary output circuit connected to the secondary winding of the transformer and to the winding of the recording head whereby the transformer secondary supplies current to the recording head, the recording head having an impedance such that as reflected in the primary winding of the transformer the impedance is relatively small over the range of frequencies to be recorded in comparison with the internal impedance of the tube, and means for providing negative feedback coupling from the secondary circuit to the input circuit, said means including an impedance having a substantial value of resistance, said impedance being connected in series with the winding of the recording head and also connected to the input circuit, voltage drop across said impedance being impressed upon the input circuit in phase opposition to the source of signal voltage being applied to the circuit for recording.

2. Apparatus as in claim 1 in which said impedance is a resistor connected in the cathode lead of the tube.

3. Apparatus as in claim 1 together with means for applying high frequency biasing voltage to the winding of the recording head, and means including a circuit anti-resonant to the biasing frequency for blocking such biasing frequency from the transformer secondary and from said impedance.

4. A magnetic recording circuit comprising a source of potentials of frequencies to be recorded, an amplifier tube of the screen grid type having an anode, a cathode, a control grid, the control grid being connected to said source, a current transformer having a primary winding connected to said anode and a secondary winding, a magnetic recording head and a resistor connected in series with said secondary winding, said resistor being connected in series with said cathode and said source and poled to oppose the potentials from said source.

5. A magnetic recording circuit in accordance with claim 4 including means for bypassing currents of the frequencies to be recorded flowing in said primary winding from said resistor while permitting such currents from the secondary winding to flow therethrough.

MYRON J. STOLAROFF.

REFERENCES CITED

The following references are of record in the file of this patent:

UNITED STATES PATENTS

| Number | Name | Date |
|---|---|---|
| 2,281,618 | Riddle | May 5, 1942 |
| 2,366,565 | Shea | Jan. 2, 1945 |
| 2,372,956 | Jordon | Apr. 3, 1945 |
| 2,522,567 | Cook | Sept. 19, 1950 |

FOREIGN PATENTS

| Number | Country | Date |
|---|---|---|
| 497,319 | Great Britain | Dec. 12, 1938 |

OTHER REFERENCES

"Electronic Circuits and Tubes," pages 413, 414